March 17, 1931.         G. A. PAULSON         1,797,155
HEATING DEVICE FOR MOTORS
Filed April 15, 1929
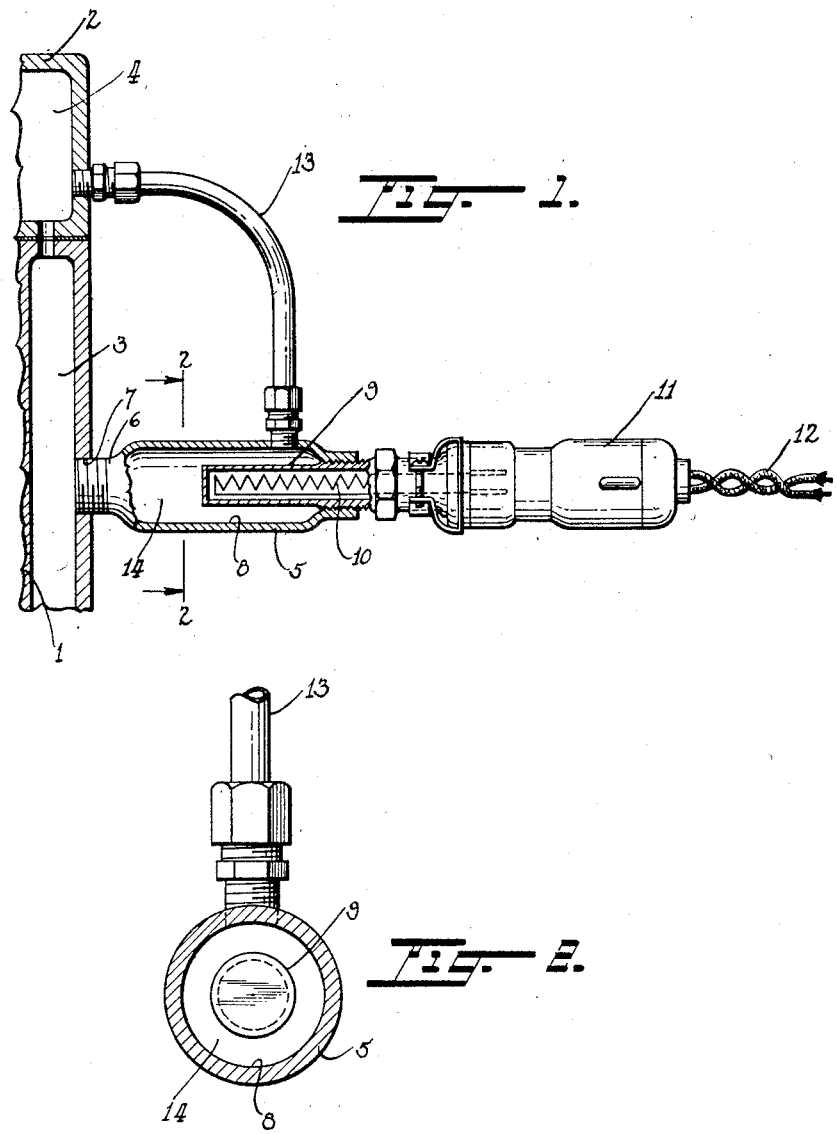
INVENTOR
G. A. Paulson
BY
ATTORNEYS Patented Mar. 17, 1931

1,797,155

UNITED STATES PATENT OFFICE

GUSTAV A. PAULSON, OF CHICAGO, ILLINOIS

HEATING DEVICE FOR MOTORS

Application filed April 15, 1929. Serial No. 355,176.

My invention relates to improvements in heating devices for motors, and it consists in the combinations, constructions, and arrangements herein described and claimed.

An object of my invention is to provide a heating device for motors which may be readily applied to any motor of the fluid cooling type for heating the motor when the motor is not in operation.

A further object of my invention is to provide a device of the type described which has novel means for bringing about a circulation of the fluid through the motor when the motor is not in operation, and heating the fluid during the circulation.

A further object of my invention is to provide a device of the type described which is simple in construction, and efficient for the purpose intended.

Other objects and advantages will appear in the following specification, and the novel features of the invention will be particularly pointed out in the appended claim.

My invention is illustrated in the accompanying drawings forming part of this application, in which Figure 1 is a side elevation of my device as applied to a motor, having a portion thereof shown in section, and Figure 2 is a section along the line 2—2 of Figure 1.

In carrying out my invention I make use of a motor having a block 1 and a head 2 having fluid receiving compartments 3 and 4 respectively. I provide a casing 5 which has a reduced threaded end 6 arranged to be disposed in a threaded opening 7 provided in the motor block 1. In this manner the compartment 8 within the casing 5 communicates with the compartment 3 of the cylinder block 1.

A heating unit 9 is disposed in the opposite end of the casing 5 and extends into the compartment 8. The unit 9 is provided with a heating coil 10 which is electrically connected to a source of current through a socket switch 11 and conductors 12. A tube 13 has one end disposed in communication with the compartment 8 of the casing 5, and the other end disposed in communication with the compartment 4 of the head 2.

From the foregoing description of the various parts of the device, the operation thereof may be readily understood. The device is mainly used during cold weather when the car is kept out of doors or in an unheated garage. The socket 11 may be attached to the unit 9 so as to allow the current to pass through the coil 10 and heat the unit 9. In this manner the fluid 14 in the compartment 8 is heated. The fluid enters the compartment 8 from the compartment 3. As the fluid in the compartment 8 is heated, the heated fluid passes upwardly through the tube 13 and enters the compartment 4 of the motor head 2. Additional fluid passes from the compartment 3 and into the compartment 8 to take the place of the heated fluid which has passed into the motor head through the tube 13. This brings about a circulation of the fluid through the motor thus heating the motor and retaining this heat until the current is disconnected from the unit 9.

With this construction the motor is heated thus preventing the freezing of the fluid, such as water, or the partial freezing of the oil therefore allowing the motor to be readily started. The fluid 14 may, of course, be water or any of the other fluids used for cooling the motor.

I claim:

In combination, a motor comprising a block having a liquid-containing compartment therein, a head having a liquid-containing chamber therein, said chamber being in communication with the compartment, said block having a threaded opening therein in communication with the compartment and said head having a threaded opening therein in communication with the chamber, a tubular member having a heating chamber therein, said tubular member having a threaded end portion receivable in the threaded opening in the block for providing communication between the heating chamber and the compartment, a heating unit connected with the other end of said tubular member and extending within the heating chamber, said heating unit being disposed in spaced-apart position relative to the wall of said tubular member, means for connecting said heating unit with a source of current whereby the same may be energized for heating a liquid disposed in said heating chamber, the wall of said tubular member being provided with a threaded opening therein, and a pipe member having threaded end portions, one of said end portions being disposed in the threaded opening in the wall of said tubular member and the other of said end portions being disposed in the threaded opening in the wall of said head for providing communication between said heating compartment and the liquid-containing chamber.

Signed at Chicago, in the county of Cook and State of Illinois, this 8th day of April, A. D. 1929.

GUSTAV A. PAULSON.